(12) United States Patent
Takahashi et al.

(10) Patent No.: US 11,981,375 B2
(45) Date of Patent: May 14, 2024

(54) STEERING DEVICE

(71) Applicant: Nabtesco Corporation, Tokyo (JP)

(72) Inventors: Masahiro Takahashi, Tokyo (JP); Yuto Nakai, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 324 days.

(21) Appl. No.: 17/487,641

(22) Filed: Sep. 28, 2021

(65) Prior Publication Data

US 2022/0105977 A1 Apr. 7, 2022

(30) Foreign Application Priority Data

Oct. 5, 2020 (JP) .................................. 2020-168405
Jun. 30, 2021 (JP) .................................. 2021-109193

(51) Int. Cl.
 *B62D 5/04* (2006.01)
(52) U.S. Cl.
 CPC ......... *B62D 5/0403* (2013.01); *B62D 5/0421* (2013.01)
(58) Field of Classification Search
 CPC .......................... B62D 5/0403; B62D 5/0421
 See application file for complete search history.

(56) References Cited

U.S. PATENT DOCUMENTS

2019/0162281 A1* 5/2019 Nakamura ................ F16H 1/32

FOREIGN PATENT DOCUMENTS

| JP | 2016205601 A | * | 12/2016 | .............. B25J 9/042 |
| JP | 2017-128300 A | | 7/2017 | |
| JP | 2017128302 A | * | 7/2017 | ........... B62D 5/0421 |
| KR | 2017091511 A | * | 8/2017 | ........... B62D 5/0421 |

* cited by examiner

Primary Examiner — Jacob D Knutson
(74) Attorney, Agent, or Firm — Pillsbury Winthrop Shaw Pittman, LLP

(57) ABSTRACT

A steering device according to one embodiment includes: an input device including an input shaft to which rotation associated with operation is transmitted, and a transmission shaft that is disposed orthogonal to the input shaft and rotates in conjunction with the input shaft; a reducer receiving a rotational drive force from the input device and outputting a rotational force about a rotational axis with a reduced rotational speed and an increased torque; a motor providing a rotational auxiliary force to the reducer in a direction that augments the rotational driving force; and an output arm coupled to the reducer and rotating about the rotational axis in a predetermined angular range by the rotational force outputted by the reducer. The input device is disposed on one side of the reducer. The motor is disposed adjacent to a direction orthogonal to the transmission shaft and on the one side of the reducer.

3 Claims, 3 Drawing Sheets

STEERING DEVICE

CROSS-REFERENCE TO RELATED APPLICATION

This application is based on and claims the benefit of priority from Japanese Patent Application Serial Nos. 2020-168405 (filed on Oct. 5, 2020) and 2021-109193 (filed on Jun. 30, 2021), the contents of each of which are incorporated by reference herein.

TECHNICAL FIELD

The present disclosure relates to a steering device with which its device configuration can be reduced in size.

BACKGROUND

A steering device installed in a vehicle or the like receives rotation input in accordance with operation of a steering wheel or the like and outputs rotation via a reducer. In order to reduce a load in steering of the vehicle, commonly used is a steering device with a hydraulic system to provide an auxiliary force in steering directions. In recent years, many steering devices are electrically controlled by a motor or the like and provide an auxiliary force in the operation directions (see, for example, Japanese Patent Application Publication No. 2017-128300). It is desirable that the steering device have a compact device configuration while it receives the operation input and the auxiliary rotational force input by a motor or the like.

SUMMARY

One object of the present disclosure is to provide a steering device whose device configuration is reduced in size.

A steering device according to one aspect of the present disclosure includes: an input device including an input shaft to which rotation associated with operation is transmitted, and a transmission shaft that is disposed in a direction orthogonal to the input shaft and rotates in conjunction with the input shaft, the input device generating a rotational driving force by rotation of the transmission shaft; a reducer receiving the rotational drive force from the input device, the reducer reducing a rotational speed and increasing torque compared to those of the rotational driving force, the reducer outputting a rotational force about a rotational axis with a reduced speed and an increased torque; a motor providing a rotational auxiliary force to the reducer in a direction that augments the rotational driving force; and an output arm coupled to the reducer, the output arm rotating about the rotational axis in a predetermined angular range by the rotational force outputted by the reducer. The input device is disposed on one side of the reducer. The motor is disposed adjacent to a direction orthogonal to the transmission shaft and on the one side of the reducer.

According to the aspect of the disclosure, the input device and motor are disposed on one side of the reducer, which allows the device configuration to be downsized in the radial direction of the reducer. Furthermore, the input device and the motor are provided on one side of the reducer, which allows the output arm to rotate without any rotation range limitation by the reducer.

The reducer may include: an input gear; two or more spur gears receiving the rotational driving force and rotating in mesh with the input gear; two or more eccentric cams formed on two or more shafts, each of the two or more shafts being coupled to corresponding one of the two or more spur gears; an eccentric gear rotating eccentrically with respect to a rotational axis of the input gear; and a case to which the output arm is coupled. The eccentric gear may rotate eccentrically about the rotation axis along an inner circumference of the case. The case may output rotation at a reduced rotational speed compared to that of the spur gears.

According to the aspect of the disclosure, by providing the rotational driving force to the spur gear of the reducer, the reducer can output rotation at a reduced speed compared to that of the spur gear.

(3) A steering device according to another aspect of the present disclosure includes: an input device inputting a rotational driving force associated with operation; a reducer receiving the rotational drive force from the input device, the reducer reducing a number of rotations and increasing torque compared to those of the rotational driving force, the reducer outputting a rotational force about a rotational axis with a reduced number of rotations and an increased torque; and an output portion coupled to the reducer, the output portion rotating about the rotational axis by the rotational force outputted by the reducer. The input device is disposed on one side of the reducer.

According to the aspect of the disclosure, the input device is disposed on one side of the reducer, which allows the device configuration to be downsized in the radial direction of the reducer.

(4) The input device may include: an orthogonal input portion having an input shaft that inputs the rotational driving force and a transmission shaft disposed in a direction orthogonal to the input shaft, the transmission shaft rotating in conjunction with the input shaft and providing the rotational driving force to the reducer; and a motor disposed adjacent to a direction orthogonal to the transmission shaft and providing a rotational auxiliary force to the reducer in a direction that augments the rotational driving force.

According to the aspect, the input device and the motor are provided on one side of the reducer, which allows the output arm to rotate without any rotation range limitation by the reducer.

(5) A steering device according to yet another aspect of the present disclosure includes: an input device inputting a rotational driving force associated with operation; a reducer receiving the rotational drive force from the input device, the reducer reducing a rotational speed and increasing torque compared to those of the rotational driving force, the reducer outputting a rotational force about a rotational axis with a reduced rotational speed and an increased torque; and an output arm coupled to the reducer, the output arm rotating about the rotational axis by the rotational force outputted by the reducer. The input device includes: an orthogonal input portion having an input shaft that inputs the rotational driving force and a transmission shaft disposed in a direction orthogonal to the input shaft, the transmission shaft rotating in conjunction with the input shaft and providing the rotational driving force to the reducer; and a motor disposed adjacent to a direction orthogonal to the transmission shaft and providing a rotational auxiliary force to the reducer in a direction that augments the rotational driving force. The input device is disposed on one side of the reducer. The output arm is rotatably coupled to the reducer without any rotation range limitation.

According to the aspect of the disclosure, the orthogonal input portion and motor are disposed on one side of the reducer, which allows the device configuration to be downsized in the radial direction of the reducer. Furthermore, the orthogonal input portion and the motor are provided on one side of the reducer, which allows the output arm to rotate without any rotation range limitation by the reducer.

According to the present disclosure, the configuration of the steering device can be downsized.

DESCRIPTION OF THE EMBODIMENTS

Figure 1:
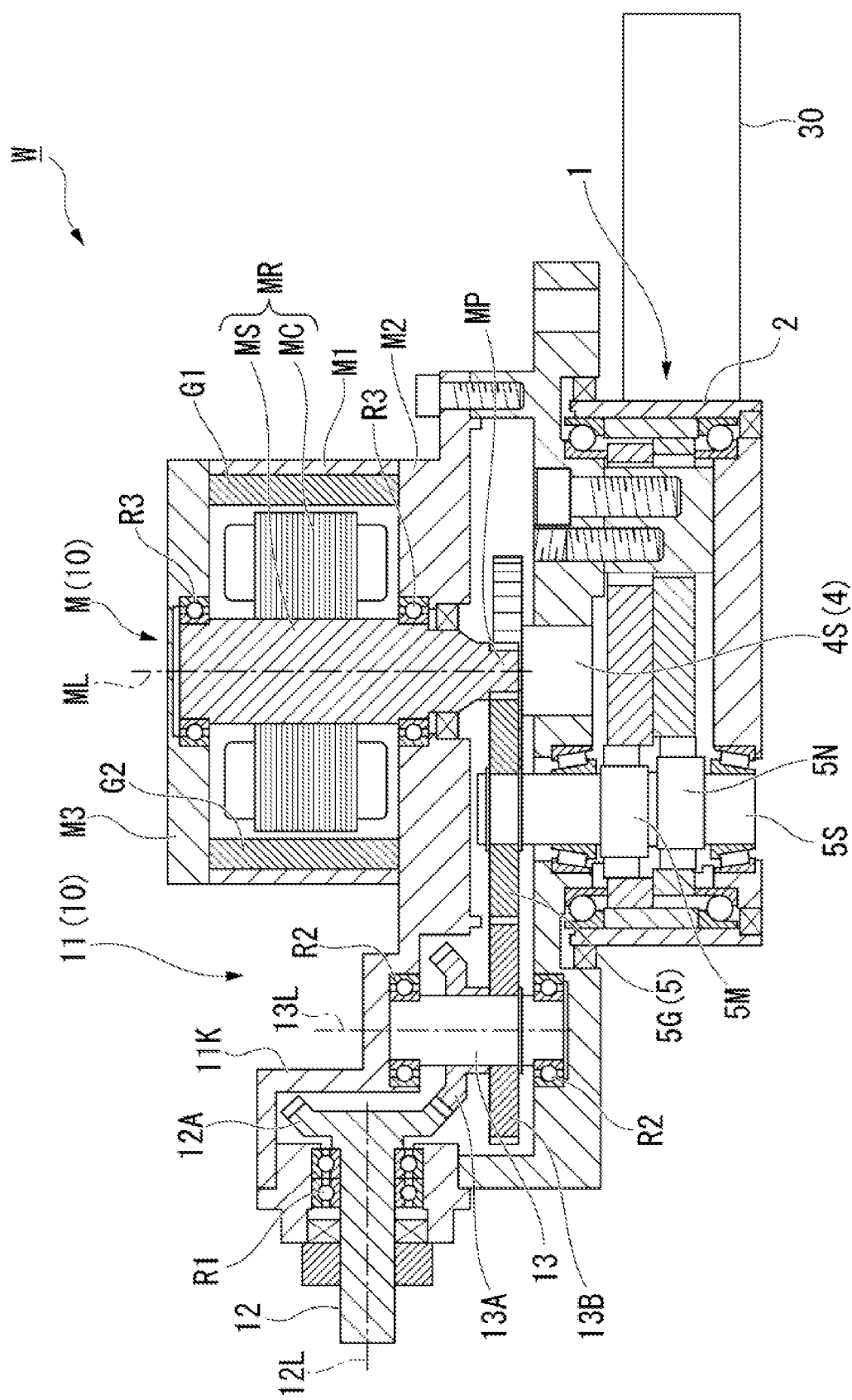
FIG. 1 is a schematic sectional view of a steering device according to one embodiment of the disclosure showing its configuration.

As shown in FIG. 1, a steering device W includes an input device 10 to which a rotational driving force for operation is inputted, a reducer 1 that increases a torque of the input rotational driving force and outputs the rotational force, and an output arm 30 (pitman arm) that is connected to the reducer 1 and rotated by the rotational force outputted by the reducer 1.

The input device 10 is situated on one side of the reducer 1. The input device 10 includes an orthogonal input portion 11 that outputs the rotational driving force for operation in a direction orthogonal to the original rotational direction of the rotational driving force, and a motor M that provides an auxiliary force for the operation.

The orthogonal input portion 11 has a housing 11K fixed on a object such as a chassis of the vehicle. An input shaft 12 to which the rotational driving force for operation is inputted is provided in the housing 11K. The input shaft 12 is formed in, for example, a cylindrical shape. The input shaft 12 is supported rotatably about an axis 12L by the housing 11K via a bearing R1. One end of the input shaft 12 is, for example, exposed to the outside of the housing 11K and connected to a steering shaft (not shown) that rotates in conjunction with steering wheel operation.

A first bevel gear 12A is formed on the other end of the input shaft 12. The first bevel gear 12A has bevel teeth formed on a conical surface thereof. A transmission shaft 13 is disposed in a direction perpendicular to the input shaft 12. The arrangement of the input shaft 12 is not limited to the illustrated one here, but may be arranged at any position around an axis 13L of the transmission shaft 13, for example, depending on the condition of the object to be installed. The transmission shaft 13 rotates in conjunction with the input shaft 12 and transmits the rotational driving force supplied by the input shaft 12 to the reducer 1. The transmission shaft 13 is formed in, for example, a cylindrical shape. One end and the other end of the transmission shaft 13 are supported rotatably about the axis 13L by the housing 11K via bearings R2. The other end side of the transmission shaft 13 is axially supported on the side closer to the reducer 1. The one end of the transmission shaft 13 is axially supported at a position away from the reducer 1.

The transmission shaft 13 has a second bevel gear 13A formed in a middle portion thereof. The second bevel gear 13A has bevel teeth formed on its conical surface. The second bevel gear 13A meshes with the first bevel gear 12A. The second bevel gear 13A is disposed between the axis 12L of the input shaft 12 and the one side of the reducer 1.

On the other end of the transmission shaft 13, a drive gear 13B is formed in the shape of a disc. The drive gear 13B is a spur gear having spur teeth formed on its outer periphery. The drive gear 13B mesh with a second gear 5G provided in the reducer 1, which will be later described. With this configuration, the orthogonal input portion 11 is able to input the rotational driving force that has been inputted by the input shaft 12 to the reducer 1 as a rotational driving force whose rotational direction has been changed to the orthogonal direction. That is, a rotation associated with the operation is transmitted to the input shaft 12, and the input device 10 generates the rotational driving force by means of the transmission shaft 13 that is arranged in the direction orthogonal to the input shaft 12 and rotates in conjunction with the input shaft 12.

In the orthogonal direction of the transmission shaft 13 in the orthogonal input section 11, the motor M is disposed adjacent to the orthogonal input portion 11. The orthogonal input portion 11 is disposed on the outer side of the periphery of the motor M and in the direction orthogonal to a rotational axis ML of a shaft MS. The motor M supplies a rotational auxiliary force to the reducer 1 in a direction that augments the rotational driving force inputted to the reducer 1. The motor M is, for example, a DC brush motor. The motor M is not limited to this and may be a DC brushless motor. Alternatively, the motor M can be any motor as long as it is capable of inputting the rotational auxiliary force to the reducer 1. The motor M includes a housing M1 fixed to the housing 11K. The housing M1 is formed in a cylindrical shape with one end closed and the other end open. The one end of the housing M1 is closed by a lid M3, which is formed in a circular disc shape.

The other end of the housing M1 is closed by an end bell M2, which is formed in a circular disc shape. The end bell M2 is fixed to the housing 11K. Inside the housing M1, permanent magnets G1 and G2 are fixed along an inner circumferential surface of the housing M1. The rotor MR is disposed in the space surrounded by the inner periphery of the housing M1 and the end bell M2. The rotor MR has a cylindrical shaft MS and a plurality of coils MC provided on the shaft MS. One end of the shaft MS is rotatably supported at the center of the lid M3 via a bearing R3.

The other end of the shaft MS is rotatably supported at the center of the end bell M2 via the bearing R3. On a portion of the shaft MS situated closer to the end bell M2 in the housing M1, for example, provided is a commutator (not shown) that has a cylindrical shape and serves as an electrical contact. The end bell M2 is provided with a pair of brushes (not shown) that flank and hold the commutator. A pair of conductors (not shown) electrically connected to electrodes of a power supply (not shown) are connected to the pair of brushes, respectively. When the pair of brushes is energized by the power supply, the rotor MR rotates. Alternatively, the commutator and the pair of brushes may be provided on the lid M3 side.

The other end of the shaft MS is exposed from the end bell M2 toward the reducer 1 side. A pinion gear MP is provided on the other end of the shaft MS. The pinion gear MP is a spur gear with spur teeth formed on its outer circumference. The pinion gear MP is engaged with a second gear 5G (described below) provided in the reducer 1. With this configuration, the motor M can rotate the rotor MR in a direction that augments the rotational driving force inputted to the second gear 5G of the reduction gear 1, and the rotational auxiliary force can be inputted to the reducer 1. The reducer 1 is fixed to the housing 11K on one side. The rotational driving force provided to the reducer 1 is reduced in the rotational speed and enhanced in the torque by the reducer 1, and then outputted from the output portion of the reducer 1 as a rotational force about a rotational axis. The output arm 30 is connected to the reducer 1. The output arm 30 rotates about the rotational axis by the rotational force outputted by the reducer 1.

Figure 2:
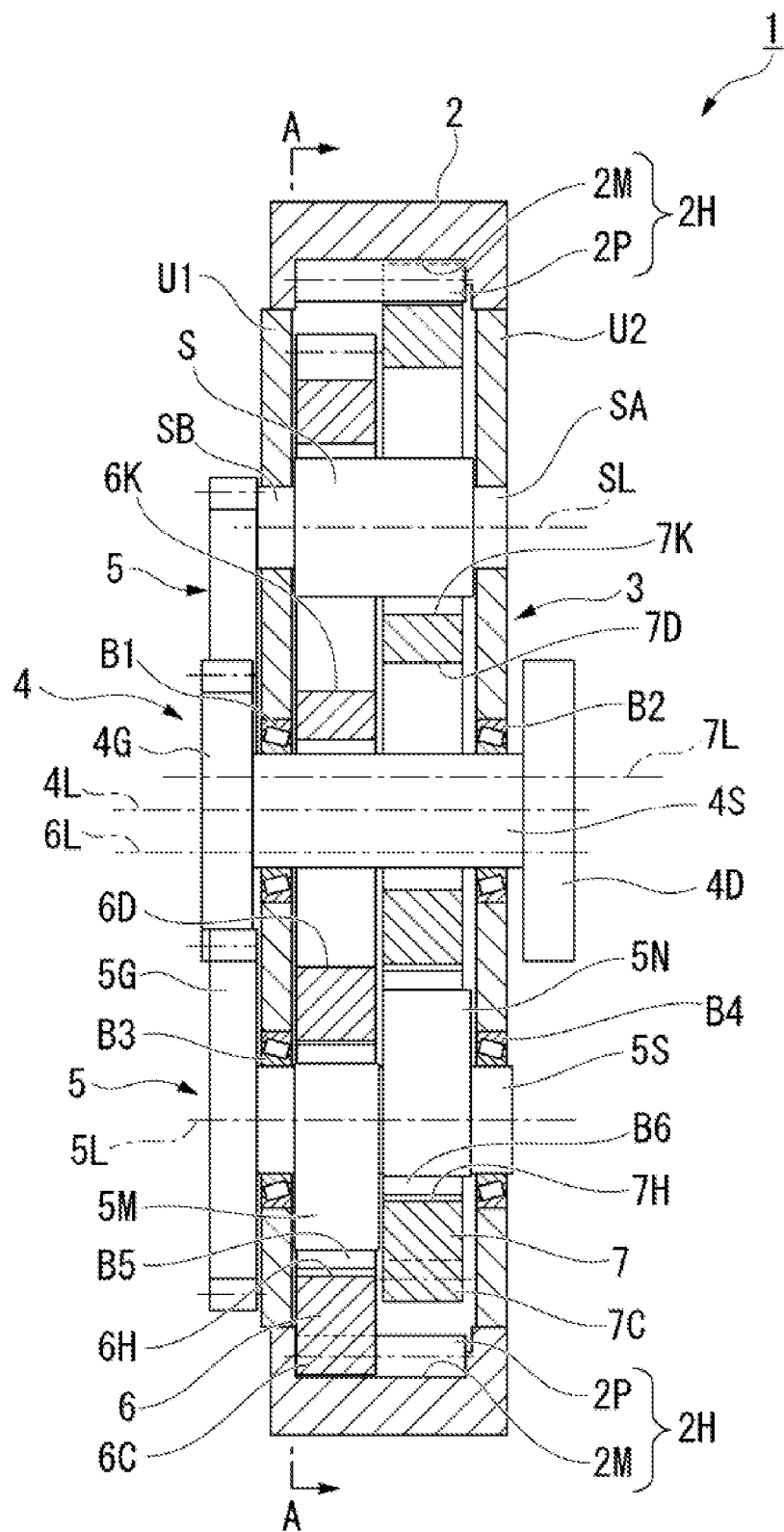
FIG. 2 is a lateral sectional view of a reducer shown in FIG. 1, which corresponds to a sectional view along the B-B line of FIG. 3.
Figure 3:
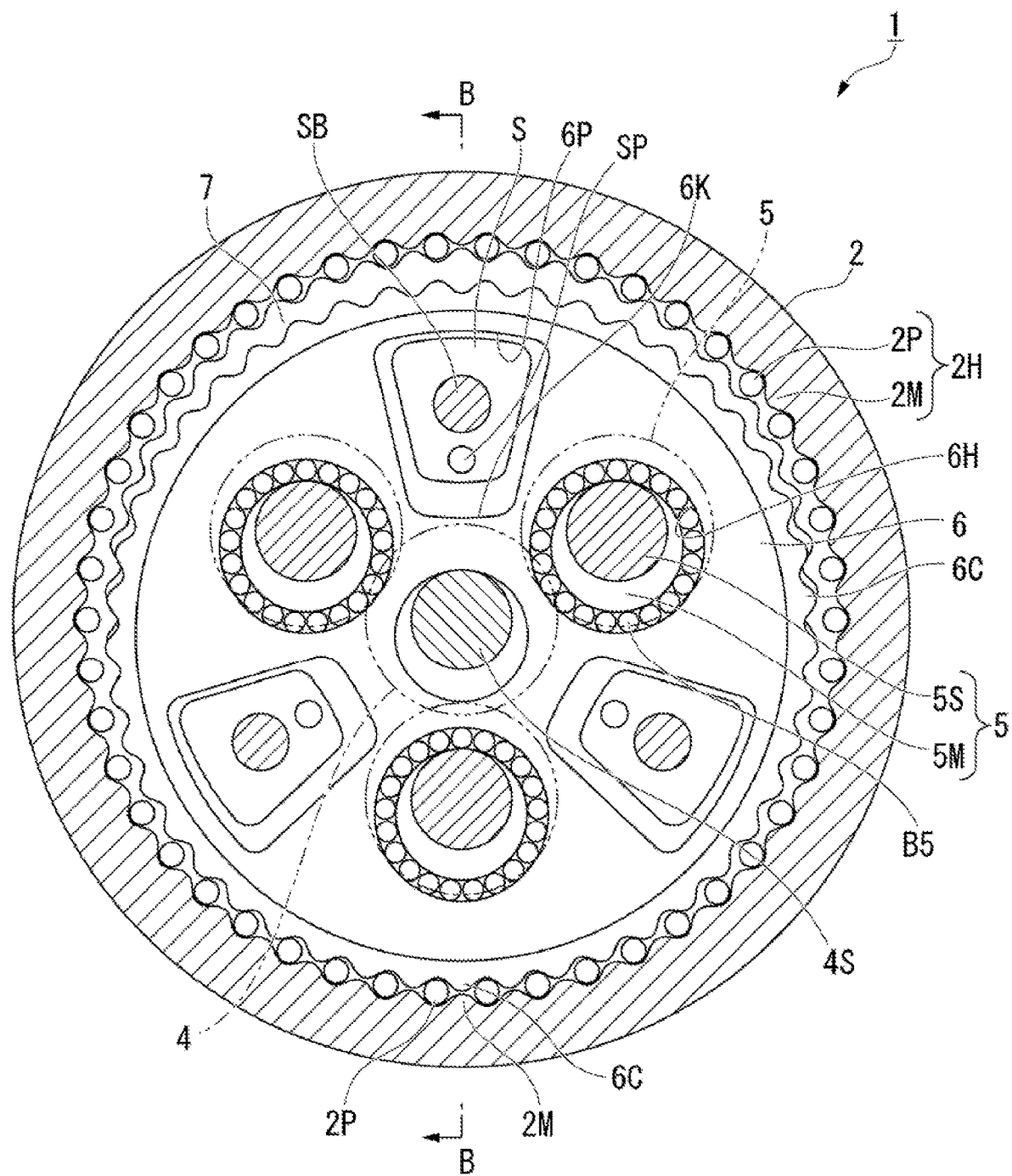
FIG. 3 is a front sectional view of the reducer shown in FIG. 1, which corresponds to a sectional view along the A-A line of FIG. 2.

As shown in FIGS. 2 and 3, the reducer 1 includes a case 2 having a cylindrical shape and a speed reducing mechanism 3 provided in the case 2. In the inner peripheral surface of the case 2, inner teeth 2H are formed. The inner teeth 2H are constituted by a plurality of pins 2P shaped like a circular column and a plurality of pin grooves 2M supporting the plurality of pins 2P, respectively. The plurality of pin grooves 2M have a substantially semicircular section. As viewed in the direction of the central axis of the case 2, the plurality of pin grooves 2M are arranged along the inner peripheral surface of the case 2.

The pin grooves 2M extend along the central axis in the inner peripheral surface of the case 2. Each of the pins 2P is in contact with associated one of the pin grooves 2M along the axial direction. As viewed in the direction of the central axis of the case 2, the plurality of pins 2P are disposed in the plurality of pin grooves 2M, respectively. With this configuration, as viewed from the central axis, the inner teeth 2H made of the plurality of pins 2P are formed in the inner peripheral surface of the case 2.

The speed reducing mechanism 3 is equipped with an input gear 4 that rotates at the center of the case 2. The input gear 4 has, for example, an end plate 4D, a first shaft 4S connected to the end plate 4D, and a first gear 4G connected to the first shaft 4S. The first gear 4G is, for example, a pinion gear MP. The end plate 4D is formed in, for example, a circular disk shape. The end plate 4D and one end of the first shaft 4S are connected coaxially with an axis 4L (rotational axis) of the first shaft 4S. Note that the end plate 4D is not essential and may not be provided depending on the installation state of the reducer 1.

The first shaft 4S is shaped like a circular column. The first shaft 4S is rotatably supported via bearings at the center of a first disc U1 and a second disc U2 each formed in a circular disc shape. The first disc U1 is disposed on one side of the reducer 1. The first disc U1 is fixed to the housing 11K. The second disc U2 is provided on the other side of the reducer 1. The first gear 4G, which is formed in a circular disc shape having a predetermined number of spur teeth, is coupled to the other end of the first shaft 4S. In the input gear 4, for example, the first gear 4G side of the first shaft 4S is axially supported by the first disc U1 via a bearing B1.

In the input gear 4, for example, the end plate 4D side of the first shaft 4S is axially supported by the second disc U2 via a bearing B2. Examples of the bearings B1, B2 include a ball bearing and a roller bearing. A plurality of spur gears 5 mesh with the input gear 4. In the embodiment, three spur gears 5 are arranged around the input gear 4 at regular intervals. However, the number of the spur gears 5 is not limited to three but may be larger than three.

One of the three spur gears is driven to rotate and the rotation causes the input gear 4 to rotate. The rotation of the input gear 4 causes the other two spur gears 5 to rotate in tandem. Each of the spur gears 5 includes, for example, a second gear 5G meshing with the first gear 4G, a second shaft 5S coupled coaxially to the second gear 5G, and a first eccentric cam 5M and a second eccentric cam 5N formed on the second shaft 5S.

One of the three second gears 5G is engaged with the drive gear 13B and pinion gear MP (first gear 4G) (see FIG. 1). That is, one of the three spur gears 5 receives a rotational driving force from the orthogonal input 11 and a rotational auxiliary force from the motor M in the direction augmenting the rotational driving force. This causes the second shaft 5S to rotate.

The second shaft 5S is shaped like a circular column. One end side of the second shaft 5S is rotatably supported on the second disc U2 via the bearing B4. The other end side of the second shaft 5S is rotatably supported on the first disc U1 via the bearing B3.

The other end side of the second shaft 5S and the second gear 5G are coupled together coaxially with the axis 5L (rotational axis) of the second shaft 5S. The second gear 5G is formed in, for example, a circular disc shape having a predetermined number of spur teeth. When the second gear 5G is rotationally driven by the first gear 4G, the second shaft 5S rotates in conjunction with the rotation of the second gear 5G. The second shaft 5S has the first eccentric cam 5M and the second eccentric cam 5N formed integrally therewith. The first eccentric cam 5M and the second eccentric cam 5N are shaped like a circular column, for example. The first eccentric cam 5M is formed eccentrically such that its central axis is off the axis 5L of the second shaft 5S.

The second eccentric cam 5N is formed eccentrically such that its central axis is off the axis 5L of the second shaft 5S. The direction of eccentricity of the second eccentric cam 5N is opposite to that of the first eccentric cam 5M. The first eccentric cam 5M and the second eccentric cam 5N rotate in conjunction with the second shaft 5S coupled to the second gear 5G. The first eccentric cam 5M drives a first eccentric gear 6 disposed in the case 2.

The first eccentric gear 6 is shaped like a disc. The first eccentric gear 6 has a circular through-hole 6D formed at the central axis 6L of the first eccentric gear 6. The through-hole 6D has a larger diameter than the first shaft 4S. The through-hole 6D is penetrated by the first shaft 4S. The through-hole 6D has such a diameter that the first shaft 4S does not contact the first eccentric gear 6 when the first eccentric gear 6 rotates eccentrically, as will be described later.

The first eccentric gear 6 has outer teeth 6C formed along the outer periphery of the first eccentric gear 6. A part of the outer teeth 6C mesh with the inner teeth 2H formed along the inner peripheral surface of the case 2. For example, the number of the outer teeth 6C is smaller than that of the inner teeth 2H by one or more. The first eccentric gear 6 rotates eccentrically relative to the axis 4L (rotational axis) of the input gear 4. The first eccentric gear 6 does not slide but rolls along the inner peripheral surface of the case 2 with a part of the outer teeth 6C meshing with the inner teeth 2H, and thus the first eccentric gear 6 rotates eccentrically.

The first eccentric gear 6 has, for example, three first through-holes 6H that rotatably support three first eccentric cams 5M, respectively. Each of the first through-holes 6H has a circular opening. The first eccentric cam 5M is rotatably supported in the first through-hole 6H via a needle bearing B5. The first eccentric gear 6 has three second through-holes 6K disposed between the three first through-holes 6H. However, the number of the second through-holes 6K is not limited to three but may be larger than three depending on the number of the first through-holes 6H, for example.

The second through-holes 6K are formed symmetrically as viewed from the direction of the central axis 6L of the first eccentric gear 6. The second through-holes 6K have a thin portion 6P formed of a region having a smallest thickness between the second through-holes 6K and the outer teeth 6C.

The second eccentric cam 5N drives a second eccentric gear 7 disposed in the case 2. The second eccentric gear 7 is shaped like a disc.

The second eccentric gear 7 has a circular through-hole 7D formed at the central axis 7L of the second eccentric gear 7. The through-hole 7D has a larger diameter than the first shaft 4S. The through-hole 7D is penetrated by the first shaft 4S. The through-hole 7D has such a diameter that the first shaft 4S does not contact the second eccentric gear 7 when the second eccentric gear 7 rotates eccentrically, as will be described later. The second eccentric gear 7 has outer teeth 7C formed along the outer periphery of the second eccentric gear 7. A part of the outer teeth 7C mesh with the inner teeth 2H formed along the inner peripheral surface of the case 2. For example, the number of the outer teeth 7C is smaller than that of the inner teeth 2H by one or more. The second eccentric gear 7 rotates eccentrically relative to the axis 4L (rotational axis) of the input gear 4.

The second eccentric gear 7 does not slide but rolls along the inner peripheral surface of the case 2 with a part of the outer teeth 7C meshing with the inner teeth 2H, and thus the second eccentric gear 7 rotates eccentrically. The second eccentric gear 7 rotates in conjunction with the first eccentric gear 6, and it rotates eccentrically with its direction of eccentricity being opposite to that of the first eccentric gear 6. Since the second eccentric gear 7 and the first eccentric gear 6 rotate in conjunction with each other, the balance of the speed reducer 1 is maintained.

The second eccentric gear 7 has, for example, three first through-holes 7H that rotatably support three second eccentric cams 5N, respectively. Each of the first through-holes 7H has a circular opening. The second eccentric cam 5N is rotatably supported in the first through-hole 7H via a needle bearing B6. The second eccentric gear 7 has three second through-holes 7K disposed between the three first through-holes 7H. However, the number of the second through-holes 7K is not limited to three but may be larger than three depending on the number of the first through-holes 7H, for example.

The second through-holes 7K are formed symmetrically as viewed from the direction of the central axis 7L of the second eccentric gear 7. The second through-holes 7K are formed in the same manner as the second through-holes 6K of the first eccentric gear 6. Specifically, the second through-holes 7K have a thin portion (not shown) formed of a region having a smallest thickness between the second through-holes 7K and the outer teeth 7C.

Coupling shafts S are inserted into the second through-holes 6K of the first eccentric gear 6 and the second through-holes 7K of the second eccentric gear 7 respectively. One ends of the coupling shafts S are coupled to the second disc U2 that axially supports one ends of the three second shafts 5S rotatably. The other ends of the coupling shafts S are coupled to the first disc U1 that axially supports the other ends of the three second shafts 5S rotatably. Three coupling shafts S are provided to correspond to the three second through-holes 6K, 7K.

Each coupling shaft S penetrates the second through-holes 6K, 7K, and one end SA side thereof projects from the second disc U2. One end SA side and the other end SB side of the coupling shaft S are shaped like a circular column in a sectional view in the direction of the axis SL. One end SA side of the coupling shaft S is supported on the second disc U2. The other end SB side of the coupling shaft S is supported on the first disc U1. The coupling shafts S are formed symmetrical in the sectional view in the direction of the axis SL.

As viewed in the direction of the axis SL, the other end SB side of the coupling shaft S is positioned on the first disc U1 by a pin SP. As viewed in the direction of the axis SL, one end SA side of the coupling shaft S may be positioned on the second disc U2 by a pin SP. The coupling shaft S is fixed to, for example, the housing 11K via the first disc U1. With this configuration, the first disc U1, the coupling shaft S, and the second disc U2 are fixed to the housing 11K. Furthermore, the case 2 rotates relative to the first disc U1, the coupling shaft S, and the second disc U2. The case 2 reduces a rotational speed of the rotational driving force compared to the rotational driving force supplied to the orthogonal input portion 11 and the torque of the rotational driving force is enhanced by the case 2. The case 2 outputs such rotational driving force as a rotational force about the axis 4L (rotational axis).

In conjunction with the rotation of the case 2, the output arm 30 connected to the case 2 rotates about the axis 4L (rotational axis). The output arm 30 is, for example, formed in a rod shape. A proximal end of the output arm 30 is connected to, for example, the outer periphery of the case 2. The output arm 30 is coupled to the reducer 1 such that the arm is freely rotatable about the axis 4L. In other words, the output arm is connected to the reducer 1 and is rotatable about the rotational axis ML in a prescribed angular range by the rotational force provided by the reducer 1.

For example, a ball joint (not shown) is provided in a tip portion of the output arm 30. The tip of the output arm 30 is connected to a steering mechanism (not shown). The connecting position of the output arm 30 to the case 2 is not limited to the illustrated embodiment, but may be connected at any position around the axis 4L (rotational axis), for example, depending on the position of the connection target to which the tip of the output arm 30 is connected. With this configuration, the orthogonal input portion 11 and the motor M, which form the input device 10, are not arranged in the outer circumferential direction of the case 2 of the reducer 1. Therefore, the output arm 30 is freely rotatable in the outer circumferential direction of the case 2 of the reducer 1 without any rotation range limitation. Thus, the output arm 30 can be connected to the case 2 of the reducer 1 at any position in the circumferential direction of the case.

Next, a description is given of an operation of the steering device W.

In the orthogonal input portion 11, the rotational driving force according to the operation is supplied to the input shaft 12. Thus, when the input shaft 12 rotates about the axis 12L, the first bevel gear 12A rotates in conjunction with the rotation of the input shaft 12. When the first bevel gear 12A rotates, the second bevel gear 13A, which meshes with the first bevel gear 12A, rotates in conjunction with the first bevel gear 12A. When the second bevel gear 13A rotates, the transmission shaft 13 rotates in conjunction with the second bevel gear 13A about the axis 13L, which is disposed in the direction orthogonal to the axis 12L of the input shaft 12.

When the input gear 4 rotates, the first gear 4G rotates about the axis 4L via the first shaft 4S in conjunction with the input gear 4. This causes the plurality of second gears 5G meshing with the first gear 4G to rotate around the axis 5L. Father, the rotation of each second gear 5G causes the second shaft 5S to rotate. The rotation of the second shaft 5S causes the first eccentric cam 5M and the second eccentric cam 5N to rotate eccentrically around the axis 5L.

The rotation of the first eccentric cam 5M causes the first eccentric gear 6 to rotate eccentrically around the axis 4L along the inner peripheral surface of the case 2. Also, the rotation of the second eccentric cam 5N causes the second eccentric gear 7 to rotate eccentrically around the axis 4L along the inner peripheral surface of the case 2. The rotation of the second eccentric gear 7 is out of phase with the rotation of the first eccentric gear 6 by a half rotation. Further, the rotation of the first eccentric gear 6 and the second eccentric gear 7 causes the first disc U1 and the second disc U2 to rotate simultaneously around the axis 4L relative to the case 2.

The first disc U1 and the second disc U2 are fixed to the housing 11K. Therefore, the case 2 rotates about the axis 4L relative to the first disc U1 and second disc U2. Thus the number of rotations of the case 2 is smaller than that of the end plate 4D.

The rotation of the plurality of spur gears 5 causes the first eccentric gear 6 and the second eccentric gear 7 to move eccentrically around the axis 4L. At this time, each coupling shaft S moves relatively along the shape of the inner periphery of the associated second through-hole 6K of the first eccentric gear 6, without contacting with the inner periphery of the second through-hole 6K. Likewise, each coupling shaft S moves relatively along the shape of the inner periphery of the associated second through-hole 7K of the second eccentric gear 7, without contacting with the inner periphery of the second through-hole 7K.

The eccentric movement of the first eccentric gear 6 and the second eccentric gear 7 causes the case 2 to rotate about the axis 4L relative to the first disc U1 and the second disc U2. Thus the number of rotations of the case 2 is smaller than that of the input gear 4. When a rotation object that receives the rotational output is coupled to the case 2, provided is a rotational output having a lower speed and a higher torque than the input gear 4. In conjunction with the rotation of the case 2, the output arm 30 rotates about the axis 4L. In this case, the output arm 30 rotates without any rotation range limitation.

As described above, in the steering device W, the orthogonal input portion 11 is disposed on the outer side of the periphery of the motor M and in the direction orthogonal to the rotational axis ML of the shaft MS. Therefore, the device configuration can be made smaller in the radial direction of the reducer 1. Furthermore, in the steering device W, the orthogonal input portion 11 and the motor M are not disposed in the rotation range of the output arm 30 in the circumferential direction of the reducer 1. Therefore, the output arm 30 can rotate without any rotation range limitation.

In the embodiments disclosed herein, an object that are composed of multiple components may be integrated into a single body object, or conversely, an object composed of a single component may be divided into multiple components. As long as it is configured such that the purpose of the invention can be achieved, such components may be integrated or separately provided. The present invention is not limited to the above embodiments but encompasses various modifications of the above embodiments not departing from the purport of the present invention. For example, the transmission shaft 13 and motor M may not only drive the spur gear 5, but also the input gear 4.

INDUSTRIAL APPLICABILITY

According to the present disclosure, the configuration of the steering device can be downsized. Accordingly, the present disclosure is industrially applicable.

What is claimed is:

1. A steering device, comprising:
an input device including an input shaft to which rotation associated with operation is transmitted, and a transmission shaft that is disposed in a direction orthogonal to the input shaft and rotates in conjunction with the input shaft, the input device generating a rotational driving force by rotation of the transmission shaft;
a reducer receiving the rotational drive force from the input device, the reducer reducing a rotational speed and increasing torque compared to those of the rotational driving force, the reducer outputting a rotational force about a rotational axis with a reduced rotational speed and an increased torque;
a motor providing a rotational auxiliary force to the reducer in a direction that augments the rotational driving force; and
an output arm coupled to the reducer, the output arm rotating about the rotational axis in a predetermined angular range by the rotational force outputted by the reducer,
wherein the input device includes a housing that houses the input shaft and the transmission shaft,
wherein the reducer is disposed such that one side of the reducer is fixed to the housing,
wherein the reducer includes a case outputting the rotational force, the case is disposed closer on the other side of the reducer than on one side of the reducer and rotates about the rotation axis,
wherein the motor includes a motor housing fixed to the housing,
wherein the motor housing is disposed adjacent to a direction orthogonal to the transmission shaft, and the motor housing is disposed on an opposite side of the case therebetween the housing along the rotation axis, and
wherein the output arm is connected to an outer periphery of the case, and the output arm is configured to rotates in conjunction with the rotation of the case without any rotation range limitation.

2. The steering device of claim 1, wherein the reducer includes:
an input gear;
two or more spur gears configured to receive the rotational driving force and rotating in mesh with the input gear;
two or more eccentric cams formed on two or more shafts, each of the two or more shafts being coupled to corresponding one of the two or more spur gears; and
an eccentric gear configured to rotate eccentrically with respect to a rotational axis of the input gear, and
wherein the eccentric gear is configured to rotate eccentrically about the rotation axis along an inner circumference of the case, and
wherein the case is configured to output rotation with a reduced speed compared to that of the spur gears.

3. The steering device of claim 2, wherein the transmission shaft includes a drive gear,
wherein the motor includes a shaft provided a first gear, the shaft is rotatably disposed inside the motor housing,
wherein each of the spur gears includes a second gear, the second gear of one of the spur gears is engaged with the drive gear and the first gear,
wherein the input gear rotates in conjunction with the rotation of a spur gear that engages with the drive gear and the first gear, and wherein the remaining spur gears rotates in conjunction with the rotation of the input gear.

* * * * *